March 10, 1970     J. T. BARNES     3,499,973
SUPPORT BRACKET FOR STANDOFF INSULATORS AND THE LIKE
Filed July 11, 1968     2 Sheets-Sheet 1
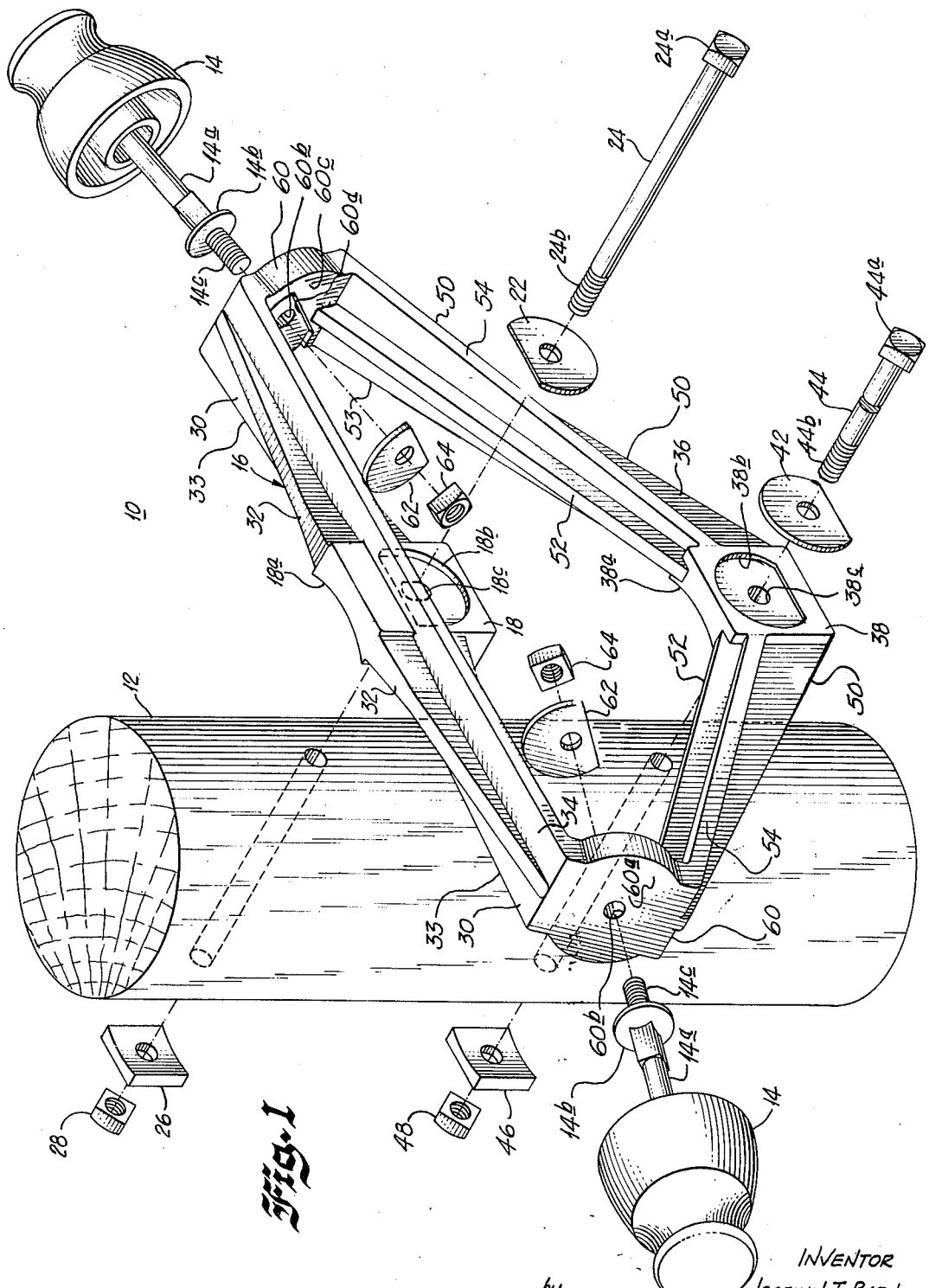
INVENTOR
JOCELYN T. BARNES
by
Mason, Kolehmainen, Rathburn & Wyss
ATTORNEYS.

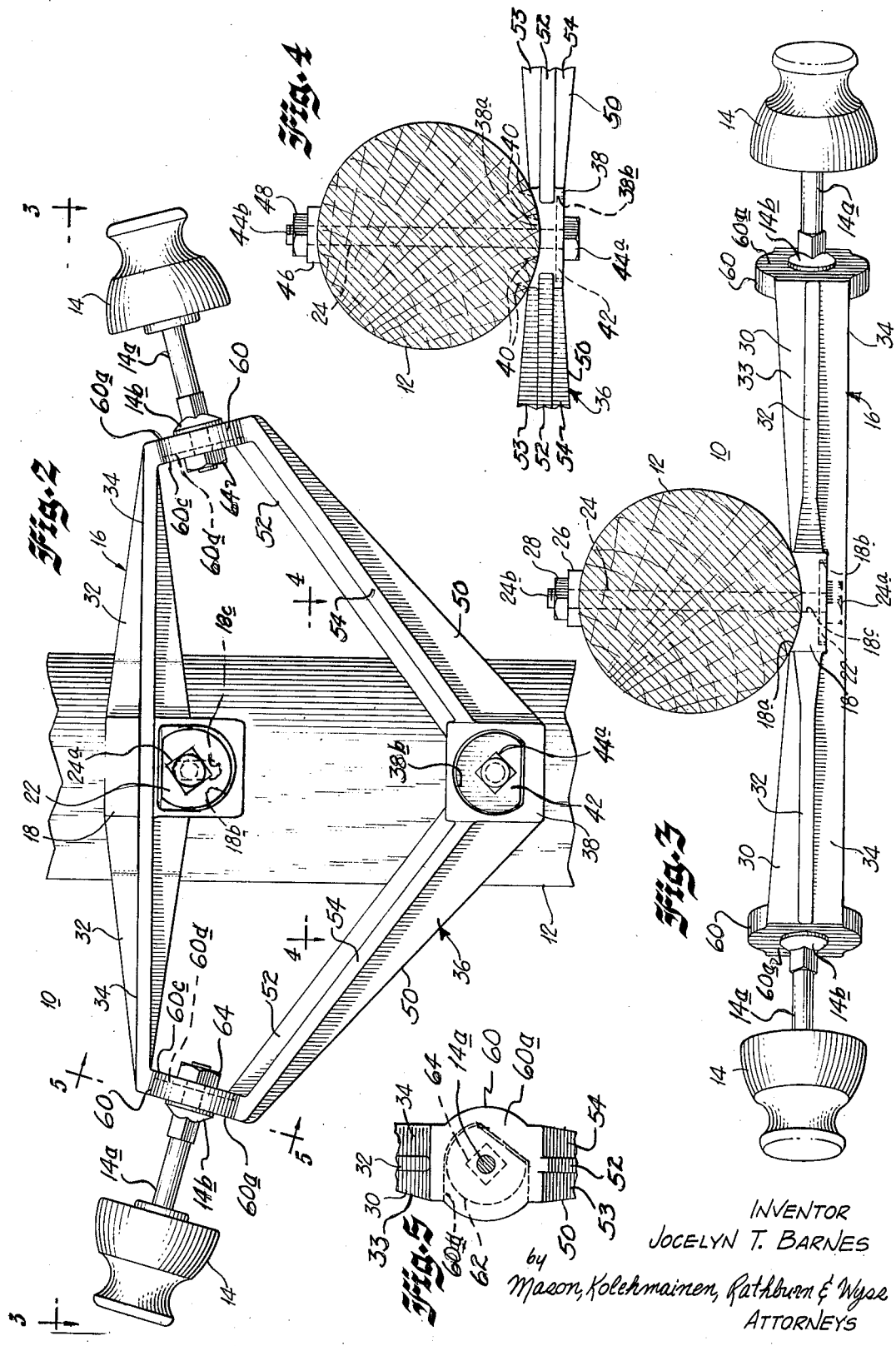

United States Patent Office 3,499,973
Patented Mar. 10, 1970

3,499,973
SUPPORT BRACKET FOR STANDOFF
INSULATORS AND THE LIKE
Jocelyn T. Barnes, Charlevoix, Mich., assignor to Lexalite Corporation, Charlevoix, Mich., a corporation of Michigan
Filed July 11, 1968, Ser. No. 744,018
Int. Cl. E04h *12/24;* E01b *17/00;* H02g *7/20*
U.S. Cl. 174—149                  9 Claims

ABSTRACT OF THE DISCLOSURE

An integral support bracket for attachment to the side of an upright utility pole for supporting standoff insulators, and the like, laterally thereof, comprising upper and lower spaced apart, laterally extending cross members, each having a saddle portion on one side intermediate its ends for mounting contact with the surface of the pole. A pair of laterally spaced apart, upwardly extending insulator support members are integrally joined to the opposite ends of the upper and lower cross members, and the bracket is integrally molded of dielectric, plastic material, such as a polycarbonate resin, which may include a dielectric filler, such as glass fibers.

---

The present invention relates to a new and improved support bracket for use in mounting power line insulators on utility poles.

It is an object of the present invention to provide a new and improved support bracket having improved mechanical and electrical strength characteristics.

Another object of the present invention is to provide a new and improved support bracket for supporting a pair of standoff insulators, or the like, on a utility pole laterally offset therefrom having improved resistance to weathering and corrosive elements in the atmosphere.

Yet another object of the present invention is the provision of a new and improved support bracket of the character described which is strong and durable and is formed in one piece of molded, dielectric, plastic material.

Another object of the present invention is the provision of a new and improved support bracket of the character described which is able to withstand severe weather conditions including extreme variations in temperature and yet retain its high mechanical and electrical strength characteristics.

Another object of the present invention is the provision of a new and improved insulator support bracket formed entirely of molded, homogeneous, dielectric, resinous material.

Another object of the present invention is the provision of a new and improved support bracket of the character described which has improved strength characteristics to resist impact and shock forces caused by normal weathering or acts of vandalism.

Still another object of the present invention is the provision of a new and improved support bracket which is light in weight, mechanically strong, and has improved electrical characteristics.

Still another object of the present invention is a new and improved support bracket capable of supporting a pair of standoff insulators, and the like, from a utility pole, which is easily manipulated for installation on a utility pole with a minimum of labor by a lineman.

Still another object of the present invention is the provision of a new and improved support bracket for standoff insulators, and the like, which is formed of integrally molded, dielectric, polycarbonate resin and, accordingly, is relatively unaffected by ultraviolet light and severe weather conditions, and has a high resistance to the absorption of moisture.

Still another object of the present invention is the provision of a new and improved support bracket for standoff insulators, and the like, which can be readily mass produced on an economical basis.

Briefly, the foregoing and other objects of the present invention are accomplished by a new and improved support bracket for attachment on a utility pole for supporting standoff insulators, and the like, which is formed in one piece of molded, dielectric, plastic material. The bracket includes an upper, laterally extended cross member with a saddle on one side of the cross member intermediate its ends for mounting attachment against a side of the pole. A lower cross member, also having a mounting saddle intermediate its opposite ends, is spaced below the upper cross member and the outer ends of the cross members are integrally joined by a pair of spaced apart, upwardly extending insulator support members on which standoff insulators and other electrical components can be added.

For a better understanding of the present invention, reference should be had to the following detailed description taken in conjunction with the drawings, in which:

FIG. 1 is a perspective view of a new and improved support bracket for supporting a pair of standoff insulators, and the like, laterally offset from a utility pole;

FIG. 2 is a side elevational view of the support bracket of FIG. 1;

FIG. 3 is a top elevational view of the support bracket of FIG. 1;

FIG. 4 is a horizontal sectional view showing the lower cross member of the bracket as it is attached to a utility pole; and FIG. 5 is a side elevational view of the standoff insulator supporting portions of the bracket.

Referring now, more particularly, to the drawings, therein is illustrated a new and improved support bracket generally referred to by the reference numeral 10, which is adapted to be mounted on the side of an upstanding utility pole 12 for supporting a pair of standoff insulators 14, or other electrical components, laterally of the pole.

The bracket 10 of the present invention is fabricated in one piece from molded, dielectric, plastic resin. Polycarbonate resins now on the market are noted for their extremely high impact strength over wide temperature ranges from as low as $-275°$ F. to $+250°$ F. These resins have excellent dimensional stability and retention of physical strength over wide variations in temperature, and have high resistance to creep. Dielectric characteristics of these resins are comparable to or better than those of glass and porcelain types of insulating material and the resins have a high resistance to the absorption of moisture.

Tensile strengths in the range of 9,000 to 10,000 p.s.i., impact strengths of 11,000 to 13,000 p.s.i., as well as excellent shear strengths in the range of 9,200 p.s.i., are provided by available polycarbonate resins which are relatively light in weight, having a specific gravity of about 1.2. In addition, polycarbonate resin has excellent electrical characteristics, including a high dielectric constant ranging from 3.17 at 60 cycles per second to 2.96 at 10 cycles per second, high arc resistant characteristics, and excellent moisture absorption characteristics.

An ideal support bracket for standoff insulators and the like to be mounted on utility poles should be able to retain excellent mechanical strength characteristics when subjected to extreme weather conditions and temperature variations and the extreme loading variations, as are normally encountered because of the loads imposed by electrical distribution lines. Because of the increasing number of acts of vandalism, the bracket should have a high impact strength to resist breakage from gunshot, rocks, and other missiles.

The support bracket 10 is integrally molded in one piece out of polycarbonate resin and includes a generally horizontally extending upper cross arm 16 having a saddle portion 18 formed adjacent the center portion thereof midway or intermediate the opposite ends of the member. The saddle portion 18 includes an inwardly concave side surface 18a formed for closely matching contact and engagement against the adjacent side surface of the utility pole 12 when the support bracket is mounted thereon. The opposite side of the saddle portion 18 is formed with a shallow, truncated, elliptical recess 18b therein in order to accommodate a truncated circular washer 22 mounted adjacent the head 24a of an upper, horizontal mounting bolt 24 which extends transversely through a drilled hole in the utility pole 12 on a generally diametrical plane. The mounting bolt 24 includes a threaded portion 24b adjacent the outer end of the shank and a washer block 26 having a curved inner surface to bear against the adjacent surface of the utility pole is provided. The bolt shank projects through a vertically, elongated, elliptical hole or opening 18c centrally disposed in the shallow washer recess 18b, and a nut 28 is tightened on the threaded end 24b of the bolt to hold the bracket firmly in place on the pole with the curved surface 18a against the pole surface. The hole 18c is elongated or elliptical in cross section, rather than round, to permit slight vertical adjustments of the support bracket on the pole to take care of any horizontal or lateral misalignment of the bolt 24.

The cross member 16 includes a pair of integral, laterally outwardly extending cross arms 30 projecting from opposite sides of the central saddle portion 18, and each arm 30 includes a thickened vertical web 32 which is tapered from the maximum vertical dimension adjacent the saddle portion 18 to a minimum vertical dimension adjacent the outer end. Accordingly, the regions of greatest bending moment on the cross arms adjacent the saddle portion are resisted by the thickest portion of the vertical webs 32. The cross arms 30 also include generally horizontal transverse web portions 33 and 34 extending outwardly from opposite side faces of the vertical webs 32 and integrally joined therewith intermediate the upper and lower edges thereof. The transverse or horizontal webs 33 are tapered from a minimum width or transverse dimension adjacent the central saddle portion 18 to a maximum dimension adjacent the outer ends of the cross arms and, accordingly, the outer ends of the cross arms are deflectable in a horizontal direction transverse to the vertical webs 32 to accommodate contraction and elongation of the transmission wires, as is normally encountered in service. The web portion 34 is not tapered in width as are the web portions 33, and is of a substantially uniform, rectangular cross section extending between opposite ends of the upper cross arms 30. It will thus be seen that the cross arms 30 are substantially cross shaped in transverse cross section, rather than square or rectangular, as in conventional wood or steel cross arms.

The support bracket 10 also includes a V-shaped lower cross member 36 spaced downwardly of the upper cross member 16, and the lower cross member includes a centrally located saddle portion 38 midway or intermediate its opposite ends having a curved inside surface 38a adapted to contact the adjacent side surface of the utility pole 12. The lower saddle portion 38 includes a plurality of integral, pointed teeth or spikes 40 projecting outwardly of the concavely curved mounting surface 38a for digging into the side of the pole 12 and firmly holding the lower cross member tightly in place against the pole. The outside face of the lower saddle portion 38 is provided with a truncated circular recess 38b therein in order to accommodate a truncated circular washer 42 located adjacent the head end 44a of a lower mounting bolt 44 which projects through a hole drilled in the pole 12 spaced below the upper bolt 24. The outer end portion of the bolt shank is provided with threaded section 44b in order to accommodate a washer 46 having a curved inside face for bearing against the surface of the pole, and a nut 48 is mounted thereon to clamp the lower portion of the bracket in place.

From the foregoing, it will be seen that the support bracket 10 is positively and firmly mounted on the side of the pole 12 by means of the upper and lower mounting bolts 24 and 44, respectively, which project through the upper and lower saddle portions 18 and 38 on the centers of the upper and lower cross members 16 and 36, and rotation of the bracket about either of the bolts is thus positively restrained.

The lower cross member 36 includes a pair of upwardly and oppositely outwardly extending lateral cross arms 50, each having a vertical flange or web portion 52 and transverse web portions 53 and 54 integrally formed therewith and joined intermediate the upper and lower edges of the vertical web. Like the upper cross arms 30, the lower cross arms 50 are shaped with their vertical web portions 52 having a maximum depth adjacent the inner ends at saddle portion 38 and the vertical webs taper to a minimum depth adjacent the outer ends of the arms. Similarly, both of the lateral or transverse webs 53 and 54 of the lower cross arms 50 are tapered to increase in width outwardly of the inner end portions adjacent the central saddle portion 38 to a maximum dimension adjacent the outer ends.

From the foregoing, it will be seen that both pairs of upper and lower cross arms 30 and 50 are formed to be substantially cross shaped in transverse cross section, and the lower cross arms 50 are angularly disposed to slope upwardly and laterally outwardly toward the upper cross member 16 to thereby provide a triangular shaped framework on opposite sides of the pole 12.

In accordance with the present invention, the integral support bracket 10 is provided with a pair of insulator supporting members or bases 60 on opposite sides of the pole and each being integrally joined with the outer ends of a respective pair of upper and lower cross arms 30 and 50. Each of the insulator support bases 60 comprises a wall portion having a planar, outer mounting face 60a with a hole or opening 60b adjacent the center thereof for accommodating a shank portion 14a of a standoff insulator 14 mounted thereon. Various different types of standoff insulators and other electrical components may be mounted on the support bases 60 of the bracket 10, and the illustrated insulator 14 is typical of a type of standoff insulator that is commonly used for supporting power distribution lines and the like. The shanks 14a of the standoff insulators are provided with enlarged integral stop washer portions 14b spaced inwardly of outer threaded end portions 14c and the annular faces of the stop washers are adapted to bear against the outer surfaces 60a of the respective support bases 60, when the threaded end portions are inserted through the openings 60b. The inside faces 60c of the support bases 60 are formed with shallow, enlarged recesses 60d therein adapted to accommodate truncated, circular washers 62, and nuts 64 are tightened onto the threaded portions 14c of the insulator shanks and to hold the insulators firmly mounted in position on the bases.

FIGURE 5 of the drawings best illustrates the shape of the recesses 60d which are open at one side so that the washers 62 may be slipped horizontally or transversely into place without interference with the cross arms 30 and 50. Once the nuts 64 have been tightened to pull the annular faces of the stop washer portions 14b on the insulator shanks tightly against the outer surfaces 60a of the support bases, the shanks of the standoff insulators are firmly mounted and extend outwardly of and perpendicular to the outer mounting surfaces 60a of the respective bases.

From the foregoing, it will be seen that the integrally molded, one-piece bracket 10 is exceptionally strong yet flexible because of the unique design. Polycarbonate resins, with or without filler material, such as glass fiber, therein has proven highly satisfactory, resulting in a long and useful life even though the bracket is exposed to a wide variety of weather conditions. Unlike prior fiber glass reinforced brackets formed of polyester resins, there is little or no possibility of the polycarbonate resinous material, because of its improved characteristics, wearing away, chipping or breaking.

The tapered vertical webs 32 and 52 of the upper and lower cross arms 30 and 50, respectively, provide excellent strength against vertical loads imposed on the standoff insulators 14 and, in addition, because of the lower cross members 50 slope upwardly and outwardly from the central lower saddle portion 38, an extremely rigid structure is provided against loads imposed from ice-laden wires supported by the insulators mounted on the bracket.

The outer faces 60a of the insulator support bases 60 slope upwardly and inwardly from the bottom toward the top, giving an added increase in strength against vertical bending because of the upwardly and outwardly sloping alignment of the shanks 14a of the standoff insulators. The lateral or transverse stiffening webs 33, 34, 53, and 54 of the respective cross arms 30 and 50 permit some horizontal deflection to accommodate longitudinal displacement of the wires imposed by uneven tension loads and transmitted to the insulators 14; however, these webs provide adequate strength, especially the upper web 34, to resist excessive horizontal loads imposed on the outer ends of the cross member. The support bracket 10 is very light in weight and is easily handled for installation on the pole by a lineman. Once the upper and lower holes have been drilled in the pole, it is a simple matter to insert the upper and lower bolts 24 and 44 through the holes 18c and 38c in the saddle portions 18 and 38 of the lightweight bracket and tighten the nuts 28 and 48 on the opposite side of the pole against the washers 36 and 46.

The vertical load characteristics of the integral insulator bracket 10, constructed in accordance with the present invention, are excellent, and downward deflection of the outer ends of the upper and lower cross arms 30 and 50 was minimal even though loads of up to 3,000 pounds were imposed. Moreover, accelerated weathering tests performed on the bracket 10, fabricated of polycarbonate resin provided excellent results in that no appreciable deterioration occurred, even though excessive temperature variations and loadings were applied to the bracket. In addition, strength tests applied by exerting longitudinal or horizontal pull on insulators mounted on the support bases 60 to simulate the loading imposed by distribution lines because of contraction and expansion of the wires, resulted in excellent characteristics with relatively high loads in the range of 2,000 pounds or better before a failure occurred. Moreover, the tapering cross section of the transverse stiffening webs 33, 53, and 54 of the upper and lower cross arms 30 and 50 permitted the outer ends of the cross arms to be deflected horizontally to a considerable degree without failure of the arms.

In another test conducted on brackets constructed in accordance with the present invention, pairs of brackets were mounted on opposite sides of a pole and interconnected with channels or plates to simulate a normal wire end installation, and the strength characteristics of a pair of brackets so mounted were extremely high in resisting horizontal loading applied by pulling on the interconnecting channels in a direction similar to the pull which would be imposed by a contraction of the wires supported from the insulators or similar provision for dead-ending of the line 14. The polycarbonate support brackets exhibited excellent dielectric characteristics and no appreciable water absorption by the material was detected, even though the brackets were tested in a standard wet test, wherein the bracket is showered with water at flow rates two inches per minute at a flow angle of 45° to the horizontal, while 60-cycle, high voltage was applied to wire supported on the insulators carried by the bracket. Resistance to arcing during these conditions was extremely good and voltages in the range of 230 kv. at 60 cycles were used before visual current tracking paths on the surface of the cross arms were observed.

Although the present invention has been described by reference to a single embodiment thereof, it will be apparent that numerous other modifications and embodiments will be devised by those skilled in the art which will fall within the true spirit and scope of the present invention.

What is claimed as new and desired to be secured by Letters Patent of the United States is:

1. A support bracket for attachment to a utility pole for supporting an electrical component laterally thereof comprising at least one cross arm formed of homogeneous, dielectric, polycarbonate resin, said cross arm including an integral saddle portion on one side thereof intermediate its ends for mounting contact against the adjacent side surface of said utility pole and integrally formed mounting bases at opposite ends of the arm for supporting a pair of electrical components, said mounting bases including outwardly facing mounting surfaces sloping upwardly and inwardly toward said saddle portion of said cross arm.

2. The support bracket of claim 1 wherein said cross arm includes opposite side portions extending laterally outwardly in opposite directions from said saddle portion, each side portion including a vertically disposed web tapering in thickness from its inner end adjacent said saddle portion to its outer end.

3. The support bracket of claim 2 wherein each of said side portions includes a horizontally disposed rib integrally joined with said vertical rib intermediate the upper and lower edges thereof, said horizontal rib tapering from its inner end adjacent said saddle portion toward a maximum at its outer end.

4. A support bracket for attachment to the side of an upright utility pole for supporting a pair of standoff insulators laterally thereof comprising upper and lower spaced apart, laterally extending cross members, each cross member having a saddle portion on one side intermediate its ends for mounting contact with the adjacent side surface of said pole, and a pair of laterally spaced apart, upwardly extending insulator support members integrally joining opposite ends of said upper and lower cross members, said bracket being integrally formed of homogeneous, dielectric, polycarbonate resin.

5. The support bracket of claim 4 wherein said upper and lower cross members each include a pair of integrally formed cantilever arms extending laterally outward in opposite directions from said saddle portion, said arms on said lower cross member sloping upwardly and outwardly of said saddle portion.

6. The support bracket of claim 5 wherein each of said arms includes a vertically disposed web and a web transverse thereto integrally joined intermediate the upper and lower edge of said vertical web and projecting outwardly from opposite side faces thereof.

7. The support bracket of claim 6 wherein said vertical webs of said arms are tapered from their inner ends adjacent said saddle portion, outwardly to a minimum vertical depth adjacent the outer ends joined to said insulator support members.

8. The support bracket of claim 7 wherein said transverse webs of said arms are tapered in width from a minimum dimension at the inner ends adjacent said saddle portion to a maximum width adjacent their outer ends joined to said insulator support members.

9. The support bracket of claim 8 wherein said insulator support members include outer mounting surfaces sloping upwardly and inwardly toward said saddle portion of said upper cross member.

(References on following page)

References Cited

UNITED STATES PATENTS

| | | | |
|---|---|---|---|
| 838,537 | 12/1906 | Hamilton | 174—149 |
| 3,235,652 | 2/1966 | Lindsey | 174—45 |
| 3,272,463 | 9/1966 | Greig | 248—65 |
| 3,300,576 | 1/1967 | Hendrix et al. | 174—146 |

FOREIGN PATENTS

| | | |
|---|---|---|
| 745,317 | 2/1956 | Great Britain. |

OTHER REFERENCES

A. B. Chance Co., advertisement, Electrical World, vol. 163, No. 14, Apr. 5, 1965, pp. 96 and 97.

The Condensed Chemical Dictionary, sixth edition, published 1962 by Reinhold Publishing Corp., p. 910 relied on.

LARAMIE E. ASKIN, Primary Examiner

U.S. Cl. X.R.

52—697; 174—45; 248—221